(12) United States Patent
Olarig et al.

(10) Patent No.: US 11,500,806 B2
(45) Date of Patent: *Nov. 15, 2022

(54) SYSTEM AND METHOD FOR SUPPORTING MULTI-PATH AND/OR MULTI-MODE NMVE OVER FABRICS DEVICES

(71) Applicant: Samsung Electronics Co., Ltd., Suwon-si (KR)

(72) Inventors: Sompong Paul Olarig, Pleasanton, CA (US); Fred Worley, San Jose, CA (US); Son Pham, San Ramon, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 17/063,501

(22) Filed: Oct. 5, 2020

(65) Prior Publication Data

US 2021/0019272 A1 Jan. 21, 2021

Related U.S. Application Data

(60) Continuation of application No. 16/692,997, filed on Nov. 22, 2019, now Pat. No. 10,795,843, which is a (Continued)

(51) Int. Cl.
*G06F 13/10* (2006.01)
*G06F 13/40* (2006.01)
(Continued)

(52) U.S. Cl.
CPC ...... *G06F 13/4022* (2013.01); *G06F 13/1668* (2013.01); *G06F 13/4068* (2013.01); (Continued)

(58) Field of Classification Search
CPC ............ G06F 13/4022; G06F 13/1688; G06F 13/4068; G06F 13/4282; G06F 2213/0026; G06F 2213/0028; G06F 2213/0036

See application file for complete search history.

(56) References Cited

U.S. PATENT DOCUMENTS

| | | |
|---|---|---|
| 6,295,567 B1 | 9/2001 | Bassman et al. |
| 6,345,303 B1 | 2/2002 | Knauerhase et al. |

(Continued)

FOREIGN PATENT DOCUMENTS

| | | |
|---|---|---|
| CN | 1641568 A | 7/2005 |
| CN | 101847429 B | 5/2012 |

(Continued)

OTHER PUBLICATIONS

SSD Form Factor Work Group, Enterprise SSD Form Factor 1.0a, 2012, SSD Form Factor Work Group, pp. 1-55. (Year: 2012).*

(Continued)

*Primary Examiner* — Cheng Yuan Tseng
(74) *Attorney, Agent, or Firm* — Renaissance IP Law Group LLP

(57) ABSTRACT

A system includes a fabric switch including a motherboard, a baseboard management controller (BMC), a network switch configured to transport network signals, and a PCIe switch configured to transport PCIe signals; a midplane; and a plurality of device ports. Each of the plurality of device ports is configured to connect a storage device to the motherboard of the fabric switch over the midplane and carry the network signals and the PCIe signals over the midplane. The storage device is configurable in multiple modes based a protocol established over a fabric connection between the system and the storage device.

18 Claims, 5 Drawing Sheets

Related U.S. Application Data division of application No. 16/211,923, filed on Dec. 6, 2018, now Pat. No. 10,540,311, which is a continuation of application No. 15/403,088, filed on Jan. 10, 2017, now Pat. No. 10,210,123.

(60) Provisional application No. 62/420,355, filed on Nov. 10, 2016, provisional application No. 62/366,622, filed on Jul. 26, 2016.

(51) Int. Cl.
*G06F 13/42* (2006.01)
*G06F 13/16* (2006.01)

(52) U.S. Cl.
CPC .. *G06F 13/4282* (2013.01); *G06F 2213/0026* (2013.01); *G06F 2213/0028* (2013.01); *G06F 2213/0036* (2013.01)

(56) References Cited

U.S. PATENT DOCUMENTS

| | | |
|---|---|---|
| 6,427,198 B1 | 7/2002 | Berglund et al. |
| 6,611,863 B1 | 8/2003 | Banginwar |
| 6,662,119 B1 | 12/2003 | Mitchell |
| 7,120,759 B2 | 10/2006 | Chiu et al. |
| 7,143,153 B1 | 11/2006 | Black et al. |
| 7,249,173 B2 | 7/2007 | Nicolson |
| 7,512,585 B2 | 3/2009 | Agarwal et al. |
| 7,536,486 B2 | 5/2009 | Sadovsky et al. |
| 7,620,854 B2 | 11/2009 | Kuttan et al. |
| 7,873,700 B2 | 1/2011 | Pawlowski et al. |
| 7,882,393 B2 | 2/2011 | Grimes et al. |
| 7,944,812 B2 | 5/2011 | Carlson et al. |
| 8,065,347 B1 | 11/2011 | Demeyer et al. |
| 8,180,862 B2 | 5/2012 | Baker et al. |
| 8,396,981 B1 | 3/2013 | Lee et al. |
| 8,599,863 B2 | 12/2013 | Davis |
| 8,667,224 B1 | 3/2014 | Yu et al. |
| 8,832,327 B1 | 9/2014 | Lin |
| 8,943,234 B1 * | 1/2015 | Voorhees ............... G06F 3/0671 710/17 |
| 8,949,517 B2 | 2/2015 | Cohen et al. |
| 8,953,644 B2 | 2/2015 | Chandra et al. |
| 8,998,636 B2 | 4/2015 | Gomez et al. |
| 9,037,786 B2 | 5/2015 | Asnaashari et al. |
| 9,047,222 B2 | 6/2015 | Chandra et al. |
| 9,092,321 B2 | 7/2015 | Salessi |
| 9,244,865 B2 | 1/2016 | Hutchison et al. |
| 9,244,877 B2 | 1/2016 | Yang et al. |
| 9,253,275 B2 | 2/2016 | Bhogal et al. |
| 9,280,357 B2 | 3/2016 | Shaver et al. |
| 9,280,504 B2 | 3/2016 | Ben-Michael et al. |
| 9,389,805 B2 | 7/2016 | Cohen et al. |
| 9,400,749 B1 | 7/2016 | Kuzmin et al. |
| 9,460,042 B2 | 10/2016 | Iskandar et al. |
| 9,465,756 B2 | 10/2016 | Bennett |
| 9,648,148 B2 | 5/2017 | Rimmer et al. |
| 9,653,124 B2 | 5/2017 | Heyd et al. |
| 9,734,093 B2 | 8/2017 | Khemani et al. |
| 9,734,106 B2 | 8/2017 | Kotzur et al. |
| 9,785,346 B2 | 10/2017 | Yost |
| 9,785,355 B2 | 10/2017 | Huang |
| 9,785,356 B2 | 10/2017 | Huang |
| 9,811,481 B2 | 11/2017 | Bhatia et al. |
| 9,830,082 B1 | 11/2017 | Srinivasan et al. |
| 9,842,084 B2 | 12/2017 | Friedman et al. |
| 9,904,330 B2 | 2/2018 | Schuette et al. |
| 9,906,596 B2 | 2/2018 | Sikdar |
| 9,934,173 B1 | 4/2018 | Sakalley et al. |
| 9,934,183 B2 | 4/2018 | Brassac et al. |
| 9,959,240 B2 | 5/2018 | Mundt |
| 9,965,367 B2 | 5/2018 | Shih |
| 9,990,313 B2 | 6/2018 | Monji et al. |
| 10,019,388 B2 | 7/2018 | Long |
| 10,063,638 B2 | 8/2018 | Huang |
| 10,108,450 B2 | 10/2018 | Pinto et al. |
| 10,114,778 B2 | 10/2018 | Worley et al. |
| 10,162,784 B2 * | 12/2018 | Bassett ............... G06F 13/4282 |
| 10,206,297 B2 | 2/2019 | Breakstone et al. |
| 10,223,313 B2 | 3/2019 | Shih |
| 10,223,316 B2 | 3/2019 | Mataya |
| 10,235,313 B2 | 3/2019 | Lee et al. |
| 10,255,215 B2 | 4/2019 | Breakstone et al. |
| 10,275,356 B2 | 4/2019 | Chou et al. |
| 10,289,517 B2 | 5/2019 | Beerens |
| 10,289,588 B2 * | 5/2019 | Chu ..................... G06F 13/4022 |
| 10,318,443 B2 | 6/2019 | Su |
| 10,346,041 B2 | 7/2019 | Olarig et al. |
| 10,372,648 B2 | 8/2019 | Qiu |
| 10,372,659 B2 | 8/2019 | Olarig et al. |
| 10,394,723 B2 * | 8/2019 | Yang ..................... G06F 13/28 |
| 10,452,576 B2 | 10/2019 | Stuhlsatz |
| 10,467,163 B1 | 11/2019 | Malwankar et al. |
| 10,467,170 B2 | 11/2019 | McKnight |
| 10,474,589 B1 | 11/2019 | Raskin |
| 10,560,550 B1 | 2/2020 | Xue et al. |
| 10,592,144 B2 | 3/2020 | Roberts et al. |
| 10,733,137 B2 | 8/2020 | Kachare et al. |
| 10,866,911 B2 | 12/2020 | Qiu et al. |
| 10,901,927 B2 | 1/2021 | Fischer et al. |
| 10,929,327 B1 | 2/2021 | Schrempp et al. |
| 10,942,666 B2 | 3/2021 | Pydipaty et al. |
| 11,113,046 B1 | 9/2021 | Bowen et al. |
| 11,126,352 B2 | 9/2021 | Olarig et al. |
| 11,347,740 B2 | 5/2022 | Moshe et al. |
| 2002/0087887 A1 | 7/2002 | Busam et al. |
| 2002/0095491 A1 | 7/2002 | Edmonds et al. |
| 2002/0123365 A1 | 9/2002 | Thorson et al. |
| 2003/0058818 A1 | 3/2003 | Wilkes et al. |
| 2004/0073912 A1 | 4/2004 | Meza |
| 2004/0111590 A1 | 6/2004 | Klein |
| 2004/0147281 A1 | 7/2004 | Holcombe et al. |
| 2004/0153844 A1 | 8/2004 | Ghose et al. |
| 2005/0025125 A1 | 2/2005 | Kwan |
| 2005/0060442 A1 | 3/2005 | Beverly et al. |
| 2005/0120157 A1 | 6/2005 | Chen et al. |
| 2006/0059287 A1 | 3/2006 | Rivard et al. |
| 2006/0095625 A1 | 5/2006 | Wootten et al. |
| 2006/0136621 A1 | 6/2006 | Tung et al. |
| 2006/0202950 A1 | 9/2006 | Lee et al. |
| 2008/0003845 A1 | 1/2008 | Hong et al. |
| 2008/0288708 A1 | 11/2008 | Hsueh |
| 2009/0073896 A1 | 3/2009 | Gillingham et al. |
| 2009/0077478 A1 | 3/2009 | Gillingham et al. |
| 2009/0217188 A1 | 8/2009 | Alexander et al. |
| 2009/0222733 A1 | 9/2009 | Basham et al. |
| 2009/0259364 A1 | 10/2009 | Vollmer et al. |
| 2010/0077067 A1 | 3/2010 | Strole |
| 2010/0100858 A1 | 4/2010 | Schipper |
| 2010/0106836 A1 | 4/2010 | Schreyer et al. |
| 2010/0169512 A1 | 7/2010 | Matton et al. |
| 2011/0131380 A1 | 6/2011 | Rallens et al. |
| 2011/0151858 A1 | 6/2011 | Lai |
| 2012/0056728 A1 | 3/2012 | Erdmann et al. |
| 2012/0102580 A1 | 4/2012 | Bealkowski |
| 2012/0207156 A1 | 8/2012 | Srinivasan et al. |
| 2012/0311654 A1 | 12/2012 | Dougherty, III et al. |
| 2013/0117503 A1 | 5/2013 | Nellans et al. |
| 2013/0117766 A1 | 5/2013 | Bax et al. |
| 2013/0179624 A1 | 7/2013 | Lambert et al. |
| 2013/0198311 A1 | 8/2013 | Tamir et al. |
| 2013/0242991 A1 | 9/2013 | Basso et al. |
| 2013/0282953 A1 | 10/2013 | Orme et al. |
| 2013/0304979 A1 | 11/2013 | Zimmer et al. |
| 2013/0311795 A1 | 11/2013 | Cong et al. |
| 2013/0318371 A1 | 11/2013 | Hormuth |
| 2013/0325998 A1 | 12/2013 | Hormuth et al. |
| 2014/0032641 A1 | 1/2014 | Du |
| 2014/0052928 A1 | 2/2014 | Shimoi |
| 2014/0122746 A1 | 5/2014 | Shaver et al. |
| 2014/0195711 A1 | 7/2014 | Bhatia et al. |
| 2014/0258679 A1 | 9/2014 | McGee |
| 2014/0281458 A1 | 9/2014 | Ravimohan et al. |

(56) References Cited

U.S. PATENT DOCUMENTS

| | | |
|---|---|---|
| 2014/0317206 A1 | 10/2014 | Lomelino et al. |
| 2014/0330995 A1 | 11/2014 | Levy et al. |
| 2014/0344431 A1 | 11/2014 | Hsu et al. |
| 2015/0006758 A1 | 1/2015 | Holtman et al. |
| 2015/0039815 A1 | 2/2015 | Klein |
| 2015/0067188 A1 | 3/2015 | Chakhaiyar |
| 2015/0086017 A1 | 3/2015 | Taylor et al. |
| 2015/0106660 A1 | 4/2015 | Chumbalkar et al. |
| 2015/0120874 A1* | 4/2015 | Kim .................. H04L 67/1097 709/218 |
| 2015/0120971 A1 | 4/2015 | Bae et al. |
| 2015/0138900 A1 | 5/2015 | Choi |
| 2015/0178095 A1 | 6/2015 | Balakrishnan et al. |
| 2015/0181760 A1 | 6/2015 | Stephens |
| 2015/0205541 A1 | 7/2015 | Nishtala et al. |
| 2015/0234815 A1 | 8/2015 | Slik |
| 2015/0254088 A1 | 9/2015 | Chou et al. |
| 2015/0255130 A1 | 9/2015 | Lee et al. |
| 2015/0261434 A1 | 9/2015 | Kagan et al. |
| 2015/0286599 A1 | 10/2015 | Hershberger |
| 2015/0301757 A1 | 10/2015 | Iwata et al. |
| 2015/0301964 A1 | 10/2015 | Brinicombe et al. |
| 2015/0304423 A1 | 10/2015 | Satoyama et al. |
| 2015/0324312 A1 | 11/2015 | Jacobson et al. |
| 2015/0331473 A1 | 11/2015 | Jreji et al. |
| 2015/0350096 A1 | 12/2015 | Dinc et al. |
| 2015/0370661 A1 | 12/2015 | Swanson et al. |
| 2015/0370665 A1 | 12/2015 | Cannata et al. |
| 2015/0376840 A1 | 12/2015 | Shih |
| 2015/0381734 A1 | 12/2015 | Ebihara et al. |
| 2016/0004879 A1 | 1/2016 | Fisher et al. |
| 2016/0062936 A1 | 3/2016 | Brassac et al. |
| 2016/0077841 A1 | 3/2016 | Lambert et al. |
| 2016/0085718 A1 | 3/2016 | Huang |
| 2016/0092390 A1 | 3/2016 | Grothen et al. |
| 2016/0094619 A1 | 3/2016 | Khan et al. |
| 2016/0127468 A1 | 5/2016 | Malwankar et al. |
| 2016/0127492 A1 | 5/2016 | Malwankar et al. |
| 2016/0146754 A1 | 5/2016 | Prasad et al. |
| 2016/0188313 A1 | 6/2016 | Dubal et al. |
| 2016/0246754 A1 | 8/2016 | Rao et al. |
| 2016/0259597 A1 | 9/2016 | Worley et al. |
| 2016/0283428 A1 | 9/2016 | Guddeti |
| 2016/0306723 A1* | 10/2016 | Lu .................. G06F 11/2094 |
| 2016/0306768 A1* | 10/2016 | Mataya .................. G11C 16/26 |
| 2016/0328344 A1 | 11/2016 | Jose et al. |
| 2016/0328347 A1* | 11/2016 | Worley .............. G06F 13/4282 |
| 2016/0337272 A1 | 11/2016 | Berman |
| 2016/0366071 A1 | 12/2016 | Chandran et al. |
| 2017/0018149 A1 | 1/2017 | Shih |
| 2017/0038804 A1 | 2/2017 | Shows et al. |
| 2017/0068268 A1 | 3/2017 | Giriyappa et al. |
| 2017/0068628 A1 | 3/2017 | Calciu et al. |
| 2017/0068630 A1 | 3/2017 | Iskandar et al. |
| 2017/0168943 A1 | 6/2017 | Chou |
| 2017/0185554 A1 | 6/2017 | Fricker |
| 2017/0187629 A1 | 6/2017 | Shalev et al. |
| 2017/0206034 A1 | 7/2017 | Fetik |
| 2017/0262029 A1 | 9/2017 | Nelson et al. |
| 2017/0269871 A1 | 9/2017 | Khan et al. |
| 2017/0270001 A1 | 9/2017 | Suryanarayana et al. |
| 2017/0270060 A1 | 9/2017 | Gupta et al. |
| 2017/0286305 A1 | 10/2017 | Kalwitz |
| 2017/0317901 A1 | 11/2017 | Agrawal et al. |
| 2017/0344259 A1 | 11/2017 | Freyensee et al. |
| 2017/0344294 A1 | 11/2017 | Mishra et al. |
| 2017/0357299 A1 | 12/2017 | Shabbir et al. |
| 2017/0357515 A1 | 12/2017 | Bower, III et al. |
| 2018/0004695 A1 | 1/2018 | Chu et al. |
| 2018/0019896 A1 | 1/2018 | Paquet et al. |
| 2018/0032463 A1 | 2/2018 | Olarig et al. |
| 2018/0032469 A1 | 2/2018 | Olarig et al. |
| 2018/0032471 A1 | 2/2018 | Olarig |
| 2018/0052745 A1 | 2/2018 | Marripudi et al. |
| 2018/0074717 A1 | 3/2018 | Olarig et al. |
| 2018/0074984 A1 | 3/2018 | Olarig et al. |
| 2018/0095904 A1 | 4/2018 | Bunker et al. |
| 2018/0101492 A1 | 4/2018 | Cho et al. |
| 2018/0131633 A1 | 5/2018 | Li |
| 2018/0173652 A1 | 6/2018 | Olarig et al. |
| 2018/0210517 A1 | 7/2018 | Yun |
| 2018/0267925 A1 | 9/2018 | Rees |
| 2018/0275919 A1 | 9/2018 | Chirumamilla et al. |
| 2018/0307650 A1 | 10/2018 | Kachare et al. |
| 2018/0373609 A1 | 12/2018 | Beerens |
| 2019/0104632 A1 | 4/2019 | Nelson et al. |
| 2019/0286584 A1 | 9/2019 | Olarig et al. |
| 2019/0339888 A1 | 11/2019 | Sasidharan et al. |
| 2020/0042217 A1 | 2/2020 | Roberts et al. |
| 2020/0117663 A1 | 4/2020 | Moshe et al. |
| 2020/0293916 A1 | 9/2020 | Li |
| 2021/0342281 A1 | 11/2021 | Olarig et al. |
| 2022/0188002 A1 | 6/2022 | Olarig |
| 2022/0206693 A1 | 6/2022 | Jung et al. |

FOREIGN PATENT DOCUMENTS

| | | |
|---|---|---|
| CN | 104025063 A | 9/2014 |
| CN | 104202197 A | 12/2014 |
| CN | 104572516 A | 4/2015 |
| CN | 104615577 A | 5/2015 |
| CN | 105260275 A | 1/2016 |
| CN | 105912275 A | 8/2016 |
| CN | 103412769 B | 11/2017 |
| EP | 2290497 A1 | 2/2011 |
| EP | 2843557 A1 | 4/2015 |
| JP | H04257050 A | 9/1992 |
| JP | 2001290752 A | 10/2001 |
| JP | 2010146525 A | 7/2010 |
| JP | 2011048534 A | 3/2011 |
| JP | 2012506184 A | 3/2012 |
| JP | 2013041390 A | 2/2013 |
| JP | 2014241545 A | 12/2014 |
| JP | 2015049742 A | 3/2015 |
| JP | 2015191649 A | 11/2015 |
| JP | 2015194005 A | 11/2015 |
| JP | 20158532985 A | 11/2015 |
| JP | 2016037501 A | 3/2016 |
| JP | 2016045968 A | 4/2016 |
| JP | WO2015194005 A1 | 4/2017 |
| KR | 20090106469 A | 10/2009 |
| KR | 20120135205 A | 12/2012 |
| KR | 20150047785 A | 5/2015 |
| KR | 20150071898 A | 6/2015 |
| KR | 20160074659 A | 6/2016 |
| TW | 201445325 A | 12/2014 |
| WO | 2014209764 A1 | 12/2014 |
| WO | 2015049742 A1 | 9/2015 |
| WO | 2015191649 A1 | 12/2015 |
| WO | 2016037501 A1 | 3/2016 |
| WO | 2016085016 A1 | 6/2016 |

OTHER PUBLICATIONS

"What is the New U.2 SSD Connection?" OC3D News, Jul. 2016, https://www.overstsock3d.nrt/news/storage/what_is_the_u_2_ssd_connection/1.

Advisory Action for U.S. Appl. No. 15/256,495, dated Feb. 1, 2019.

Corrected Notice of Allowability for U.S. Appl. No. 15/256,495, dated Mar. 18, 2021.

Corrected Notice of Allowability for U.S. Appl. No. 15/256,495, dated May 13, 2021.

Corrected Notice of Allowability for U.S. Appl. No. 15/345,509, dated Aug. 11, 2021.

Corrected Notice of Allowability for U.S. Appl. No. 15/345,509, dated Aug. 30, 2021.

Corrected Notice of Allowability for U.S. Appl. No. 15/345,509, dated Dec. 10, 2021.

Corrected Notice of Allowability for U.S. Appl. No. 15/345,509, dated Jun. 15, 2021.

Corrected Notice of Allowability for U.S. Appl. No. 15/345,509, dated Oct. 27, 2021.

(56) References Cited

OTHER PUBLICATIONS

Corrected Notice of Allowability for U.S. Appl. No. 16/202,079, dated Jul. 12, 2021.
Corrected Notice of Allowability for U.S. Appl. No. 16/202,079, dated Jul. 22, 2020.
Corrected Notice of Allowability for U.S. Appl. No. 16/202,079, dated Sep. 15, 2021.
Corrected Notice of Allowability for U.S. Appl. No. 16/424,474, dated Aug. 18, 2021.
Corrected Notice of Allowability for U.S. Appl. No. 16/424,474, dated Feb. 22, 2021.
Corrected Notice of Allowability for U.S. Appl. No. 16/424,474, dated Mar. 29, 2021.
Corrected Notice of Allowability for U.S. Appl. No. 16/692,997, dated Jun. 18, 2020.
Corrected Notice of Allowability for U.S. Appl. No. 16/844,995, dated Dec. 9, 2021.
Corrected Notice of Allowability for U.S. Appl. No. 16/857,172, dated Aug. 20, 2021.
Corrected Notice of Allowability for U.S. Appl. No. 16/921,923, dated Apr. 1, 2021.
Corrected Notice of Allowability for U.S. Appl. No. 16/921,923, dated Aug. 24, 2021.
Corrected Notice of Allowability for U.S. Appl. No. 16/921,923, dated Jul. 14, 2021.
Corrected Notice of Allowability for U.S. Appl. No. 16/921,923, dated May 26, 2021.
Corrected Notice of Allowability for U.S. Appl. No. 16/950,624, dated Jul. 16, 2021.
Corrected Notice of Allowability for U.S. Appl. No. 16/950,624, dated Jun. 10, 2021.
Fang, Chin, "Using NVMe Gen3 PCIe SSD Cards in High-density Servers for High-performance Big Data Transfer Over Multiple Network Channels", SLAC National Accelerator Laboratory, Stanford University, Stanford, California, Feb. 7, 2015, 17 pages.
NVM Express over Fabrics specification Revision 1.0; NVM Express Inc.; Jun. 5, 2016. (Year: 2016).
OC3D, "What is the New U.2 SSD Connection?," (https://www.overclock3d.net/news/storage/what_is_the_new_u_2_ssd_connection/1), Jul. 2016, retrieved Apr. 12, 2021, 5 pages.
Wikipedia, "SATA Express", (https://en.wikipedia.org/wiki/SATA_Express), retrieved May 2018, 6 pages.
Wikipedia, "SATA Express," (https://en.wikipedia.org/wiki/SATA_Express), retrieved Apr. 12, 2021, 6 pages.
Wikipedia, "U.2", (https://en.wikipedia.org/wiki/U.2), retrieved May 2018, 3 pages.
Wikipedia, "U.2," (https://en.wikipedia.org/wiki/U.2), retrieved Apr. 12, 2021, 2 pages.
Notice of Allowance for U.S. Appl. No. 15/345,509, dated Feb. 8, 2022.
Notice of Allowance for U.S. Appl. No. 16/202,079, dated Mar. 17, 2022.
Notice of Allowance for U.S. Appl. No. 17/099,776, dated Feb. 15, 2022.
Office Action for U.S. Appl. No. 16/844,995, dated Feb. 22, 2022.
Office Action for U.S. Appl. No. 17/063,507, dated Mar. 17, 2022.
Final Office Action for U.S. Appl. No. 15/256,495, dated Dec. 4, 2019.
Final Office Action for U.S. Appl. No. 15/256,495, dated Oct. 19, 2018.
Final Office Action for U.S. Appl. No. 15/345,509, dated Feb. 21, 2019.
Final Office Action for U.S. Appl. No. 15/411,962, dated Dec. 20, 2018.
Final Office Action for U.S. Appl. No. 16/211,923, dated Aug. 19, 2019.
Final Office Action for U.S. Appl. No. 16/424,474, dated May 1, 2020.
Final Office Action for U.S. Appl. No. 16/692,997, dated Mar. 26, 2020.
Final Office Action for U.S. Appl. No. 16/844,995, dated Mar. 29, 2021.
Final Office Action for U.S. Appl. No. 17/063,507, dated Nov. 22, 2021.
Notice of Allowance for U.S. Appl. No. 15/256,495, dated Mar. 5, 2020.
Notice of Allowance for U.S. Appl. No. 15/345,507, dated Feb. 19, 2019.
Notice of Allowance for U.S. Appl. No. 15/345,509, dated May 13, 2021.
Notice of Allowance for U.S. Appl. No. 15/403,088, dated Oct. 22, 2018.
Notice of Allowance for U.S. Appl. No. 15/411,962, dated Mar. 18, 2019.
Notice of Allowance for U.S. Appl. No. 16/202,079, dated Jan. 27, 2021.
Notice of Allowance for U.S. Appl. No. 16/202,079, dated Jun. 1, 2020.
Notice of Allowance for U.S. Appl. No. 16/202,079, dated May 14, 2021.
Notice of Allowance for U.S. Appl. No. 16/211,923, dated Sep. 13, 2019.
Notice of Allowance for U.S. Appl. No. 16/421,458, dated Apr. 15, 2020.
Notice of Allowance for U.S. Appl. No. 16/424,474, dated Apr. 30, 2021.
Notice of Allowance for U.S. Appl. No. 16/424,474, dated Jul. 15, 2020.
Notice of Allowance for U.S. Appl. No. 16/692,997, dated Jun. 1, 2020.
Notice of Allowance for U.S. Appl. No. 16/844,995, dated Sep. 29, 2021.
Notice of Allowance for U.S. Appl. No. 16/857,172, dated May 3, 2021.
Notice of Allowance for U.S. Appl. No. 16/921,923, dated Feb. 18, 2021.
Notice of Allowance for U.S. Appl. No. 16/950,624, dated May 10, 2021.
Office Action for U.S. Appl. No. 15/256,495, dated Jun. 14, 2019.
Office Action for U.S. Appl. No. 15/256,495, dated Mar. 29, 2018.
Office Action for U.S. Appl. No. 15/345,507, dated Dec. 3, 2018.
Office Action for U.S. Appl. No. 15/345,509, dated Apr. 29, 2020.
Office Action for U.S. Appl. No. 15/345,509, dated Nov. 29, 2019.
Office Action for U.S. Appl. No. 15/345,509, dated Sep. 10, 2018.
Office Action for U.S. Appl. No. 15/345,509, dated Sep. 28, 2020.
Office Action for U.S. Appl. No. 15/403,088, dated Jun. 7, 2018.
Office Action for U.S. Appl. No. 15/411,962, dated Aug. 10, 2018.
Office Action for U.S. Appl. No. 16/202,079, dated Aug. 22, 2019.
Office Action for U.S. Appl. No. 16/202,079, dated Dec. 9, 2021.
Office Action for U.S. Appl. No. 16/202,079, dated Mar. 4, 2020.
Office Action for U.S. Appl. No. 16/211,923, dated May 6, 2019.
Office Action for U.S. Appl. No. 16/421,458, dated Dec. 30, 2019.
Office Action for U.S. Appl. No. 16/424,474, dated Feb. 3, 2020.
Office Action for U.S. Appl. No. 16/424,474, dated Oct. 15, 2019.
Office Action for U.S. Appl. No. 16/692,997, dated Dec. 19, 2019.
Office Action for U.S. Appl. No. 16/844,995, dated Sep. 4, 2020.
Office Action for U.S. Appl. No. 16/857,172, dated Oct. 8, 2020.
Office Action for U.S. Appl. No. 16/921,923, dated Oct. 28, 2020.
Office Action for U.S. Appl. No. 16/950,624, dated Jan. 25, 2021.
Office Action for U.S. Appl. No. 17/022,075, dated Oct. 15, 2021.
Office Action for U.S. Appl. No. 17/063,507, dated Aug. 6, 2021.
Office Action for U.S. Appl. No. 17/099,776, dated Sep. 24, 2021.
Corrected Notice of Allowability for U.S. Appl. No. 15/345,509, dated Jun. 10, 2022.
Final Office Action for U.S. Appl. No. 17/022,075, dated May 25, 2022.
Supplemental Notice of Allowability for U.S. Appl. No. 17/099,776, dated May 16, 2022.
Corrected Notice of Allowability for U.S. Appl. No. 15/345,509, dated Jun. 27, 2022.
Corrected Notice of Allowability for U.S. Appl. No. 16/202,079, dated Jul. 7, 2022.

(56) References Cited

OTHER PUBLICATIONS

Corrected Notice of Allowability for U.S. Appl. No. 17/099,776, dated Jun. 20, 2022.
Final Office Action for U.S. Appl. No. 17/063,507, dated Jun. 27, 2022.
Corrected Notice of Allowability for U.S. Appl. No. 15/345,509, dated Aug. 8, 2022.
Corrected Notice of Allowability for U.S. Appl. No. 16/202,079, dated Aug. 17, 2022.
Corrected Notice of Allowability for U.S. Appl. No. 17/099,776, dated Jul. 21, 2022.
Office Action for U.S. Appl. No. 17/408,365, dated Aug. 2, 2022.
Corrected Notice of Allowability for U.S. Appl. No. 15/345,509, dated Sep. 7, 2022.
Corrected Notice of Allowability for U.S. Appl. No. 16/202,079, dated Aug. 31, 2022.
Corrected Notice of Allowability for U.S. Appl. No. 17/022,075, dated Sep. 6, 2022.
Corrected Notice of Allowability for U.S. Appl. No. 17/099,776, dated Aug. 24, 2022.
Notice of Allowance for U.S. Appl. No. 16/844,995, dated Aug. 26, 2022.
Notice of Allowance for U.S. Appl. No. 17/022,075, dated Aug. 23, 2022.
Notice of Allowance for U.S. Appl. No. 17/063,507, dated Oct. 7, 2022.
Office Action for U.S. Appl. No. 17/376,145, dated Sep. 30, 2022.

\* cited by examiner

SYSTEM AND METHOD FOR SUPPORTING MULTI-PATH AND/OR MULTI-MODE NMVE OVER FABRICS DEVICES

CROSS-REFERENCE TO RELATED APPLICATION(S)

This application is a continuation application of U.S. patent application Ser. No. 16/692,997 filed Nov. 22, 2019, which is a divisional application of U.S. patent application Ser. No. 16/211,923 filed Dec. 6, 2018, now issued to U.S. Pat. No. 10,540,311, which is a continuation application of U.S. patent application Ser. No. 15/403,088 filed Jan. 10, 2017, now issued to U.S. Pat. No. 10,210,123, which claims the benefits of and priority to U.S. Provisional Patent Application Serial Nos. 62/366,622 filed Jul. 26, 2016 and entitled "SELF-CONFIGURING SSD MULTI-PROTOCOL SUPPORT IN HOST-LESS ENVIRONMENT," and 62/420,355 filed Nov. 10, 2016 and entitled "MODULAR SYSTEM ARCHITECTURE FOR SUPPORTING MULTI-PATH AND/OR MULTI-MODE NMVE OVER FABRICS DEVICES," and the disclosures of which are incorporated herein by reference in their entirety.

TECHNICAL FIELD

The present disclosure relates generally to network-attached devices, more particularly, to a system and method for supporting multi-path and/or multi-mode NVMe over fabrics (NVMeoF) devices.

BACKGROUND

Non-volatile memory express (NVMe) and NVMe over fabrics (NVMeoF) (or NVMf in short) are new emerging technologies. NVMe is a standard that defines a register-level interface for host software to communicate with a non-volatile memory subsystem (e.g., a solid-state drive (SSD)) over a peripheral component interconnect express (PCIe) bus.

NVMeoF defines a common architecture that supports an NVMe block storage protocol over a wide range of storage networking fabrics such as Ethernet, Fibre Channel, Infini-Band, and other network fabrics. For an NVMeoF-based system, an X86-based central processing unit (CPU) on a motherboard is no longer required to move data between an initiator (e.g., host software) and a target device (i.e., an NVMeoF device) because the target device is capable of moving data by itself. The term, fabric, represents a network topology in which network nodes can pass data to each other through a variety of interconnecting protocols, ports, and switches. For example, Ethernet-attached SSDs may attach directly to a fabric, and in this case the fabric is the Ethernet.

The physical connection of the NVMe is based on a PCIe bus. A typical Ethernet SSD has a U.2 connector to interface with a system via a mid-plane over the PCIe bus. In the case of the four-lane PCIe bus (PCIe x4), the two Ethernet ports consume only two lanes of the four-lane PCIe signals, and the remaining two lanes of the PCIe X4 signals remain unused.

SUMMARY

According to one embodiment, a system includes a fabric switch including a motherboard, a baseboard management controller (BMC), a network switch configured to transport network signals, and a PCIe switch configured to transport PCIe signals; a midplane; and a plurality of device ports. Each of the plurality of device ports is configured to connect a storage device to the motherboard of the fabric switch over the midplane and carry the network signals and the PCIe signals over the midplane. The storage device is configurable in multiple modes based on a protocol established over a fabric connection between the system and the storage device.

According to another embodiment, an NVMeoF includes: a PCIe module; a network engine; and a connector configured to connect to a switch motherboard over a midplane and carry PCIe signals over the midplane. The PCIe module transports PCIe signals to the switch over the PCIe bus, and the network engine transport network signals to the switch over Serial Attached SCSI (SAS) pins of the connector.

According to yet another embodiment, a system includes: a switch and a plurality of NVMeoF devices. Each NVMeoF device is configured to be coupled to the switch using a connector. The connector is configured to transport the PCIe signals to the switch over a PCIe bus and transport network signals to the switch over a network bus.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
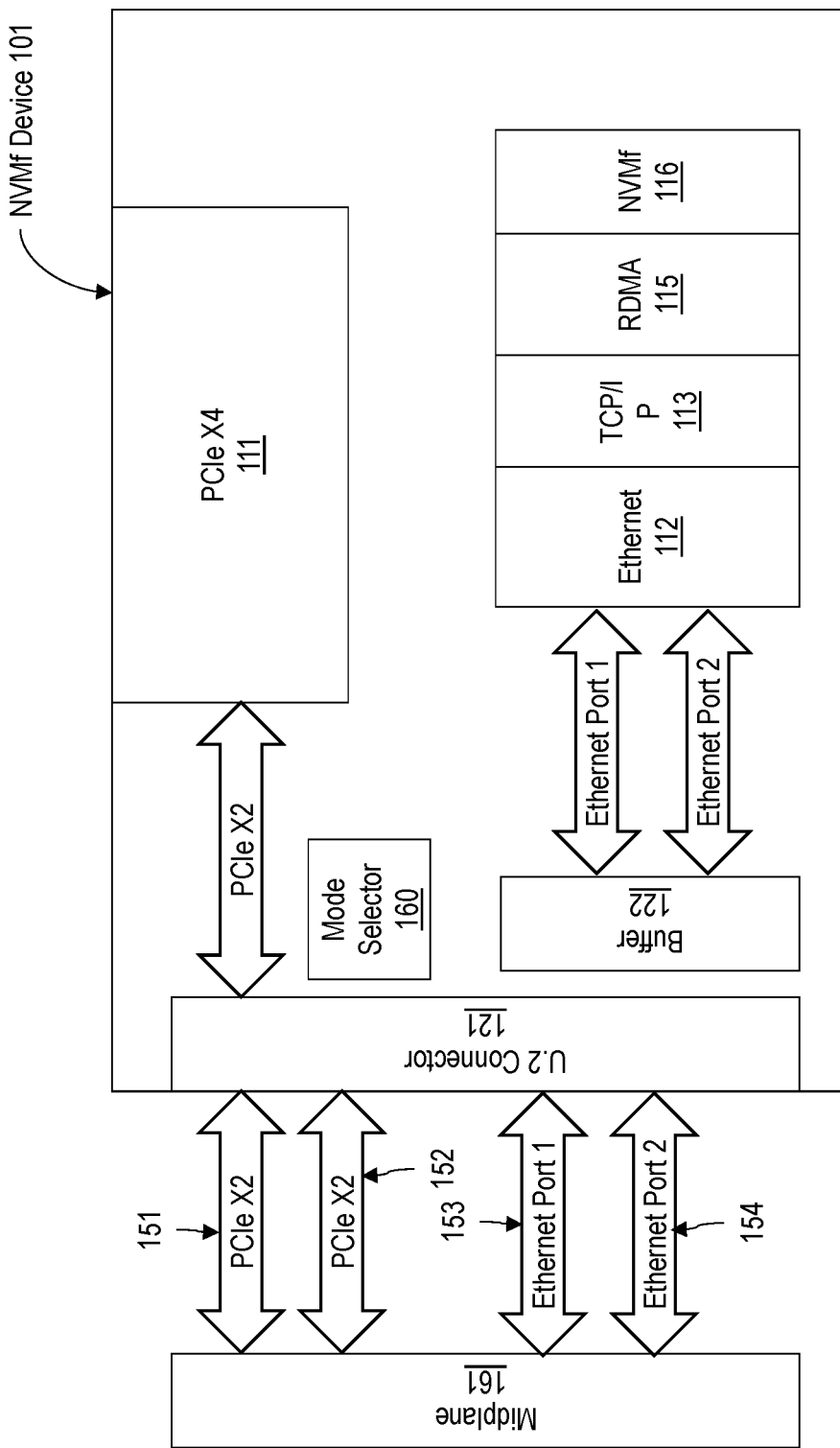
FIG. 1 illustrates a block diagram of an example NVMeoF device, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for supporting multi-path and/or multi-mode NVMeoF devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system that can support both the NVMe and NVMeoF protocols, and various types of fabric-attached SSDs (eSSDs). In some embodiments, an eSSD refers to an SSD that can support the NVMeoF protocols. When configured to support the NVMeoF standard, the system can support various fabrics including not only Ethernet, but also, Fibre Channel, InfiniBand, and other network fabrics. For the convenience of illustration, the following examples and embodiments can show an Ethernet-attached NVMeoF devices. However, it is noted that any other type of NVMeoF devices can be used without deviating from the scope of the present disclosure.

The present system provides a single platform and common building blocks that can support both single and dual pathing systems compatible with both NVMe and NVMeoF devices. According to one embodiment, the common building blocks that support single pathing and dual pathing NVMe and NVMeoF devices include a mid-plane, a chassis, a fan assembly. The present system can scale linearly by adding more similar devices and/or chassis. The present system may also include other building blocks including, but not limited to, a full-width and a half-width switch boards, and an X86 motherboard.

The fabric-attached SSD (eSSD) disclosed herein is a single common device that can be used in multiples systems compatible with NVMe and NVMeoF standards. In this sense, the fabric-attached SSD is also referred to as a multi-mode NVMeoF device. The present system provides a platform that can supporting various types of NVMe and NVMeoF devices in non-high availability (non-HA) mode (i.e., single-path input/output (I/O/)) or HA mode (i.e., multi-path I/O) with minimum hardware changes.

According to one embodiment, the multi-mode NVMeoF device can support either NVMe or NVMeoF standard by detecting product information from a known location. For example, the product information used for self-configuration is stored in the chassis is a vital product data (VPD). During the start-up, the multi-mode NVMeoF device can retrieve the VPD from the chassis and configure itself based on the VPD. However, it is noted that the multi-mode NVMeoF device can be configured in various manners without deviating from the scope of the present disclosure. For example, the multi-mode NVMeoF device can be configured by a control command over the PCIe bus issued by a BMC of the switch to which the multi-mode NVMeoF device is connected.

According to one embodiment, the multi-mode NVMeoF device can be configured in a single port NVMe mode, a dual port NVMe mode, a single port NVMeoF mode, and a dual port NVMeoF mode. Table 1 shows example use of the U.2 connector according to the configuration of the multi-mode NVMeoF device. When configured as an NVMe device, the multi-mode NVMeoF device can be configured in either the single port NVMe mode or the dual port NVMe mode. In the single port NVMe mode, the PCIe lanes 0-3 of the U.2 connector are used to carry PCIe signals. In the dual port NVMe mode, the PCIe lanes are split into 2 by 2 lanes; the PCIe lanes 0 and 1 are used for the first port, and the PCIe lanes 2 and 3 are used for the second port. When configured as an NVMeoF device, the multi-mode NVMeoF device can be configured in either the single port NVMeoF mode or the dual port NVMeoF mode. In the single port NVMeoF mode, the PCIe lanes are split into 2 by 2 lanes but only the PCIe lanes 0 and 1 are used to carry PCIe signals, and the PCIe lanes 2 and 3 are not used. The first pair of the SAS port 0 is used for the Ethernet port 0 (first port), and the SAS port 1 is not used. In the dual port NVMeoF mode, the PCIe lanes are split into 2 by 2 lanes, and the PCIe lanes 0 and 1 are used as a control plane for the first Ethernet port, and the PCIe lanes 2 and 3 are used as a control plane for the second Ethernet port. The first pair of the SAS port 0 is used for the Ethernet port 0 (first port), and the SAS port 1 is used for the Ethernet port 1 (second port).

TABLE 1

Example use of U.2 connector

| Configuration | PCIe lanes 0&1 of U.2 connector | PCIe lanes 2&3 of U.2 connector | PCIe lanes 0-3 of U.2 connector | SAS Port 0 and 1 of U.2 connector |
|---|---|---|---|---|
| Single port NVMe | | | Yes | Not used |
| Dual port NVMe | Yes - used as first port | Yes - used as second port | Split into 2 by 2 lanes | Not used |
| Single port NVMeoF | Yes - used as control plane for first Ethernet port | Not used | Split into 2 by 2 lanes | First pair of SAS port 0 used for Ethernet port 0 (first port) SAS port 1 is not used |
| Dual port NVMeoF | Yes - used as control plane for first Ethernet port | Yes - used as control plane for second Ethernet port | Split into 2 by 2 lanes | First pair of SAS port 0 used for Ethernet port 0 (first port) Second pair of SAS port 1 used for Ethernet port 1 (second port) |

If the product information is stored in a chassis, the two lanes (in a single port mode) or four lanes (in a dual port mode) of the PCIe bus on the U.2 connector are driven by a PCIe engine. In this case, the multi-mode NVMeoF device can disable the Ethernet engine(s), and the NVMe protocols and functionalities are supported or enabled. If the product information is stored in an NVMeoF chassis, the Ethernet ports use only PCIe lanes 2 and 3, or Serial Attached SCSI (SAS) pins depending on the design of the multi-mode NVMeoF device.

The present multi-mode NVMeoF device can operate in two distinct modes, namely, an NVMe mode and an NVMeoF mode. In the NVMe mode, the multi-mode NVMeoF device behaves as an NVMe device. The PCIe pins of the U.2 connector can be connected to the PCIe x4 module 111. The PCIe bus can be shared by data and control.

In one embodiment, in the NVMeoF mode, the multi-mode NVMeoF device can be configured in a single-path mode or a dual-path mode. In the single path mode, one PCIe x2 is used for control plane and is connected to one motherboard. In the dual-path mode, two PCIe x2 are used for control plane and are connected to two motherboards.

In another embodiment, the NVMeoF device can use SAS pins for the Ethernet ports in the NVMeoF mode. In the non-HA NVMeoF mode, the two lanes of the PCIe bus are used for standard features through a control plane. In the dual-port HA mode, the four lanes of the PCIe bus are split into two X2 lanes and used for port A and port B, respectively. The existing PCIe software and driver may be used as unmodified for the multi-mode NVMeoF device.

Because the multi-mode NVMeoF device can operate both in the NVMe and NVMeoF modes, the cost for developing and deploying the devices can be reduced because the same devices can be used in the NVMe mode and the NVMeoF mode. For the similar reason, the multi-mode NVMeoF device can have a faster time to the market.

The multi-mode NVMeoF device can be used in various products and chassis. The two lanes of the PCIe bus are reserved for standard features through a control plane. A CPU, a baseboard management controller (BMC), and other devices can use the two lanes of the PCIe bus as a control plane to communicate to each NVMeoF device inside the chassis at no additional cost. The NVMe mid-plane can be used as unmodified, and there is no need for a new connector on the NVMeoF device due to the additional new pins.

FIG. 1 illustrates a block diagram of an example NVMeoF device, according to one embodiment. The NVMeoF device 101 includes a PCIe X4 module 111 (e.g., PCIe X4 Gen3 module) and various hardware and protocol stacks including, but not limited to, an Ethernet network interface card (NIC) 112, and a TCP/IP offload engine 113, an RDMA controller 115, an NVMeoF protocol stack 116. The NVMeoF device 101 can support up to two PCIe X2 buses 151 and 152 and two Ethernet ports 153 and 154 that are connected to a switch motherboard (not shown) over the mid plane 161 depending on a mode of operation. The two PCIe X2 buses 151 and 152 and the two Ethernet ports 153 and 154 are connected to a U.2 connector 121 of the NVMeoF device 101.

According to one embodiment, the NVMeoF device 101 can be configured to as an NVMe device. In the NVMe mode, a mode selector 160 can configure the NVMeoF device 101 to use all of the four lanes (in a single port mode) or only two lanes (in a dual port mode) of the four lanes of the PCIe bus to carry PCIe signals. The PCI x4 bus is connected to a midplane, and the PCIe bus is shared between data and control signals.

According to another embodiment, the NVMeoF device 101 can be configured as an NVMeoF device. In the NVMeoF mode, the mode selector 160 can configure the NVMeoF device 101 to use the two lanes of the PCIe X2 bus 151 to carry PCIe signals. The NVMeoF device 101 can further configure the remaining two lanes of the PCIe bus to carry Ethernet signals over the two Ethernet ports 153 and 154. In the NVMeoF mode, the two PCIe X2 lanes are directly transported to the PCIe X4 module 111, and signals over the remaining two PCIe X2 lanes are carried over the Ethernet ports 153 and 154 and buffered in the buffer 122 to be transported to the Ethernet NIC 112 of the NVMeoF device 101. The operational mode of the NVMeoF device 101 can be self-configured or externally set. For example, the NVMeoF device 101 can self-configure its operational mode using a physical pin (e.g., a presence pin on the chassis of the switch motherboard) or by an in-band command from a BMC (e.g., BMC 201 of FIG. 2) of the switch motherboard. The manageability information retrieved through Ethernet is referred to as "in-band" information whereas the manageability information retrieved through the PCIe bus is referred to as "out-of-band" information.

The NVMeoF device 101 can push various signals and perform various services over the PCIe ports 151 and 152 using the unused PCI X2 bus over the U.2 connector. Examples of the signals that can be pushed include, but are not limited to, health status information, field-replaceable unit (FRU) information, and sensor information of the NVMEOF device 101. Examples of the services that can be pushed over the PCIe ports include, but are not limited to, discovery services to a BMC or a CPU that is local to the switchboard and download services for a new NVMeoF device firmware for performing a firmware upgrade.

The NVMeoF device 101 can push some device-specific information directly to a BMC of the switch motherboard over the PCI X2 bus 151 over a control plane established between the switch motherboard and the NVMeoF device 101. Examples of such device-specific information that can be carried over the control plane include, but are not limited to, discovery information and FRU information of the NVMEOF device 101. This can reduce the burden of the BMC for polling the status of the NVMeoF device 101. The device-specific information may be communicated between the NVMeoF device 101 and the BMC using a new device command. The NVMeoF device 101 can support high availability (HA) multipath I/O with only the two PCIe lanes 151 and 152 of the PCIe X2 bus.

Figure 2:
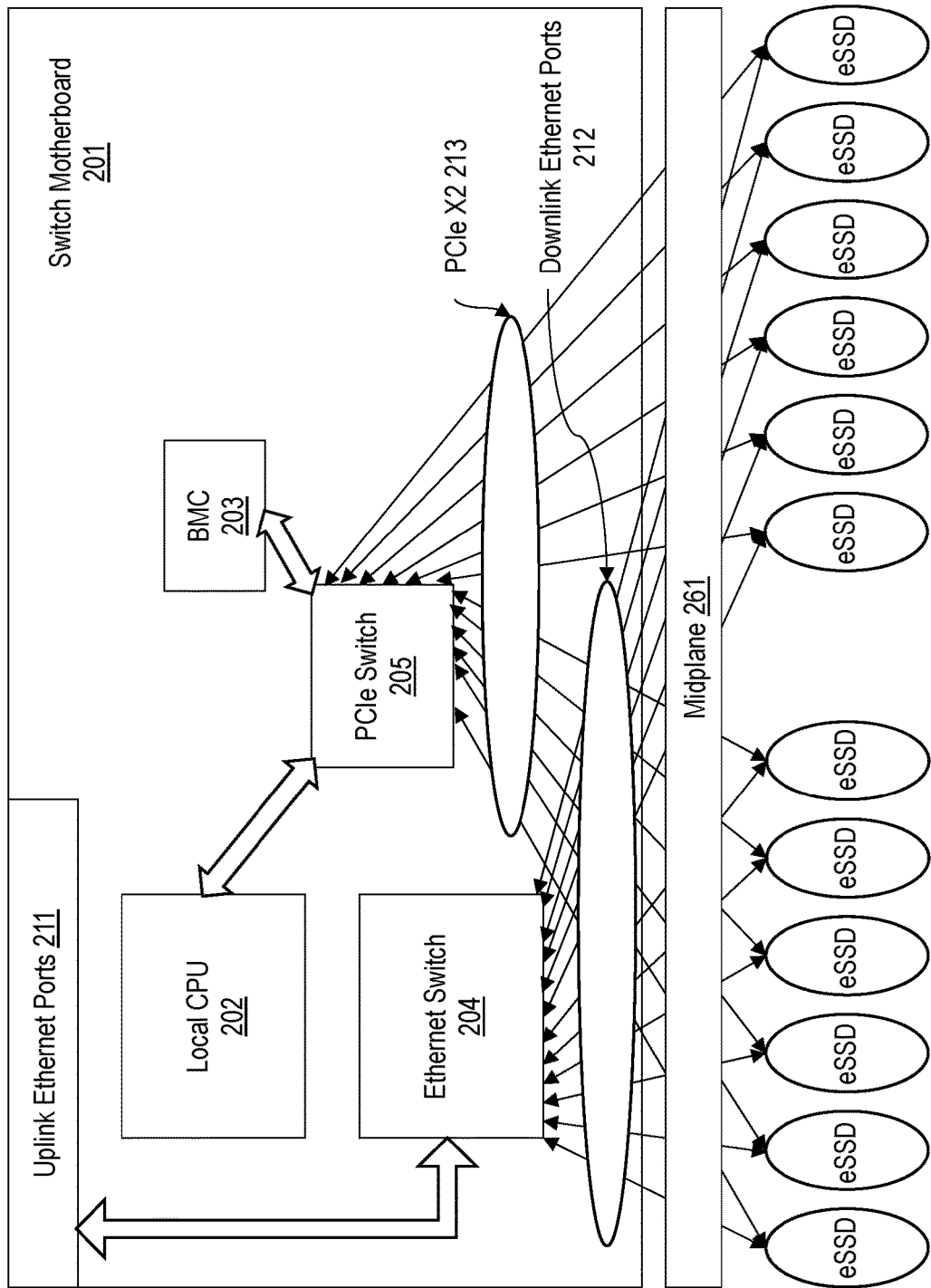
FIG. 2 illustrates a block diagram of an example switch motherboard, according to one embodiment.

FIG. 2 illustrates a block diagram of an example switch motherboard, according to one embodiment. The switch motherboard 201 has an uplink Ethernet ports 211, downlink Ethernet ports 212, a local CPU 202, a BMC 203, an Ethernet switch 204, and a PCIe switch 205. A number of eSSDs can be connected to the switch motherboard 201. According to one embodiment, the eSSD is an NVMeoF device that can be configured to work as an NVMe device or an NVMeoF device depending on the mode of operation. Each of the eSSDs can be connected to the switch motherboard 201 via a U.2 connector as shown in FIG. 1 and configured to connect to the switch motherboard 201 via several high-speed Molex connectors that collectively carrying all PCIe X2 bus 213 and the downlink Ethernet ports 212 and other non-high speed control signals such as SMBus, reset, clock, etc. The switch motherboard 201 can push various signals to each of the eSSDs and perform various services on each of the eSSDs over the PCIe X2 bus 213 and/or the downlink Ethernet ports 212 over the midplane 261. For example, the switch motherboard 201 can receive device-specific information from each of the eSSDs over the Ethernet ports 212, including, but not limited to, health status information, field-replaceable unit (FRU) information, and sensor information of the eSSD. The switch motherboard 201 can also perform various services over the Ethernet ports 212 including, but not limited to, discovery services to a BMC or a local host CPU and download services for a new eSSD firmware for performing a firmware upgrade.

Figure 3:
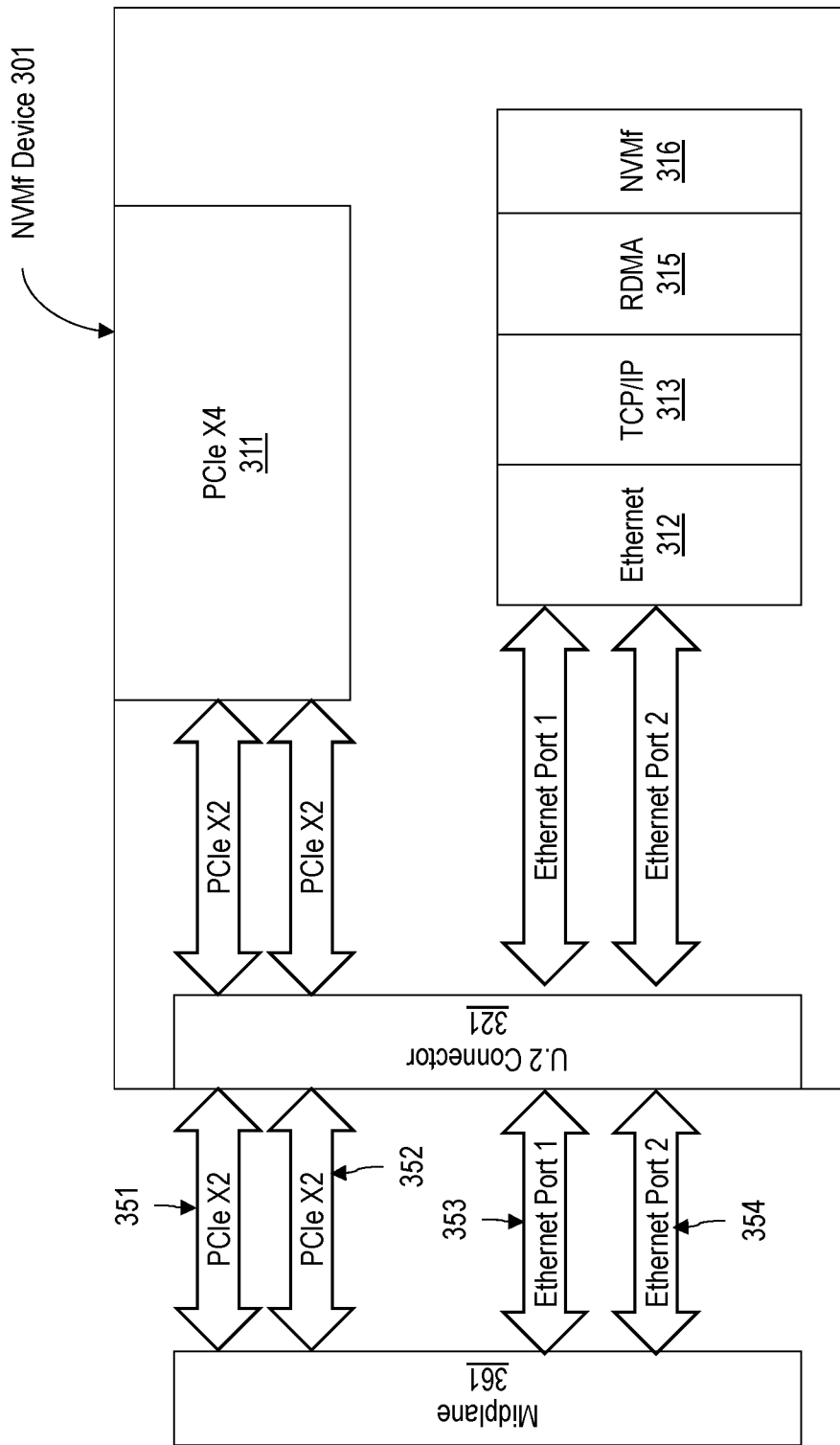
FIG. 3 illustrates a block diagram of an example NVMeoF device, according to another embodiment.

FIG. 3 illustrates a block diagram of an example NVMeoF device, according to another embodiment. The NVMeoF device 301 includes a PCIe X4 module 311 (e.g., PCIe X4 Gen3 module) and various hardware and protocol stacks including, but not limited to, an Ethernet network interface card (NIC) 312, and a TCP/IP offload engine 313, an RDMA controller 315, an NVMeoF protocol stack 316. The NVMeoF device 301 can support two PCIe X2 buses 351 and 352 and two Ethernet ports 353 and 354 that are connected to a switch motherboard (not shown) over the mid plane 361. The PCIe X2 buses 351 and 352 and the two Ethernet ports 353 and 354 are connected to a U.2 connector 321 of the NVMeoF device 301.

According to one embodiment, the NVMeoF device 301 can use the unused SAS pins of the U.2 connector 321 for Ethernet signals instead of using the PCIe lanes 153 and 154 as shown in FIG. 1. Because the NVMeoF device 301 uses the SAS pins for the Ethernet ports 353 and 354, the NVMeoF device 301 can support multi-path I/Os and multiple protocols without suffering from a bandwidth issue.

Figure 4:
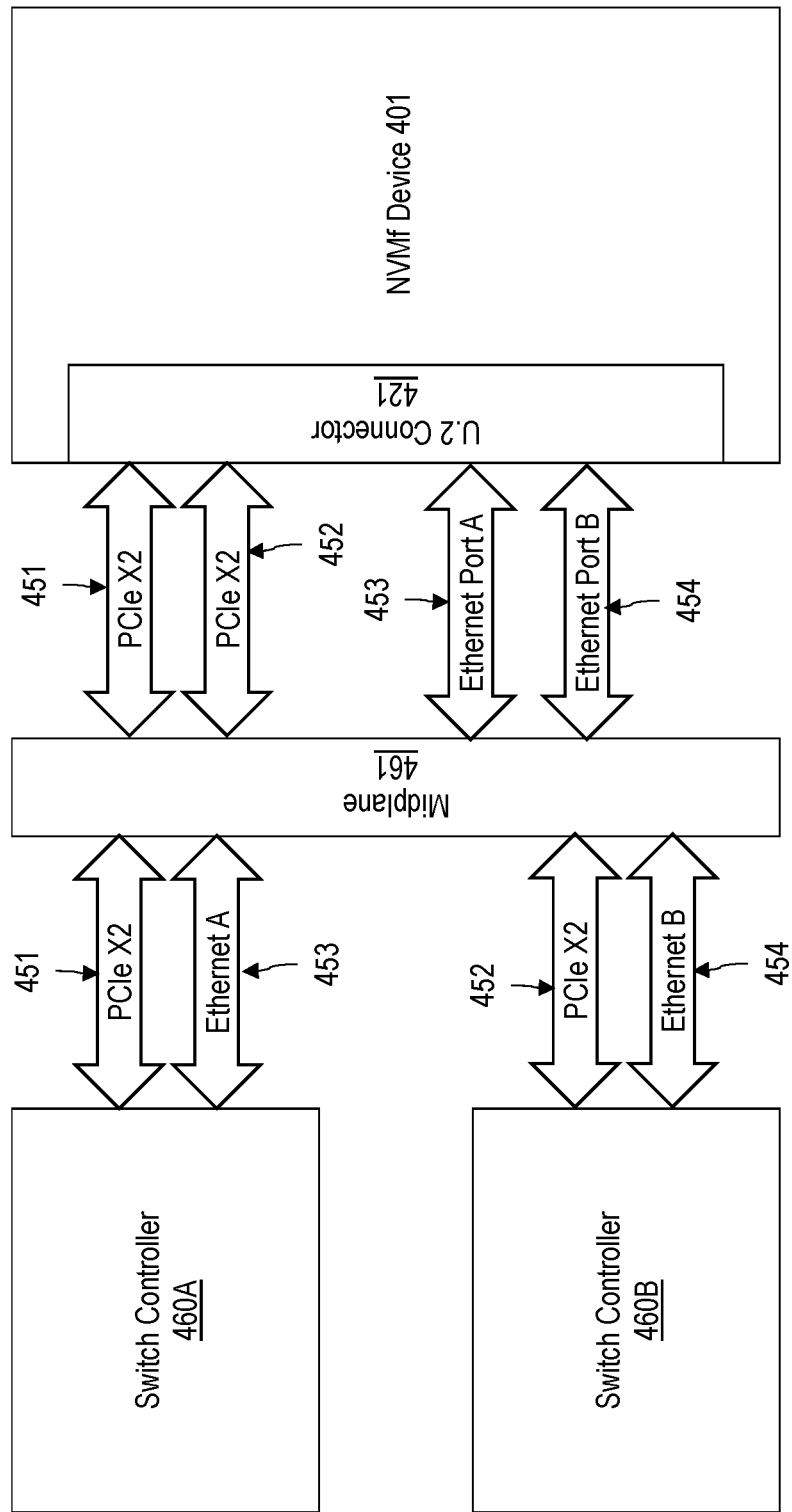
FIG. 4 illustrates a block diagram of an example NVMeoF device configured as an NVMe device operating in a HA mode, according to one embodiment.

FIG. 4 illustrates a block diagram of an example NVMeoF device configured as an NVMe device operating in a HA mode, according to one embodiment. In this example, the NVMeoF device 401 is configured as an NVMe device and can support multi-path I/Os using a U.2 connector 421. A two half-width switch includes two switch controllers 460A and 460B is contained in one 2U chassis. The NVMeoF device 401 is connected to both the switch controllers 460A and 460B via the U.2 connector over the midplane 461. The switch controller 460A can support two lanes of the PCIe bus and an Ethernet port A while the switch controller 460B can support the remaining two lanes of the PCIe bus and an Ethernet port B. The NVMeoF device 401 can connect to the switch controller 460A over the two-lane PCIe bus 451 and the Ethernet port A 453. In addition, the NVMeoF device 401 can connect to the switch controller 460B over the two-lane PCIe bus 452 and the Ethernet port B 454.

Figure 5:
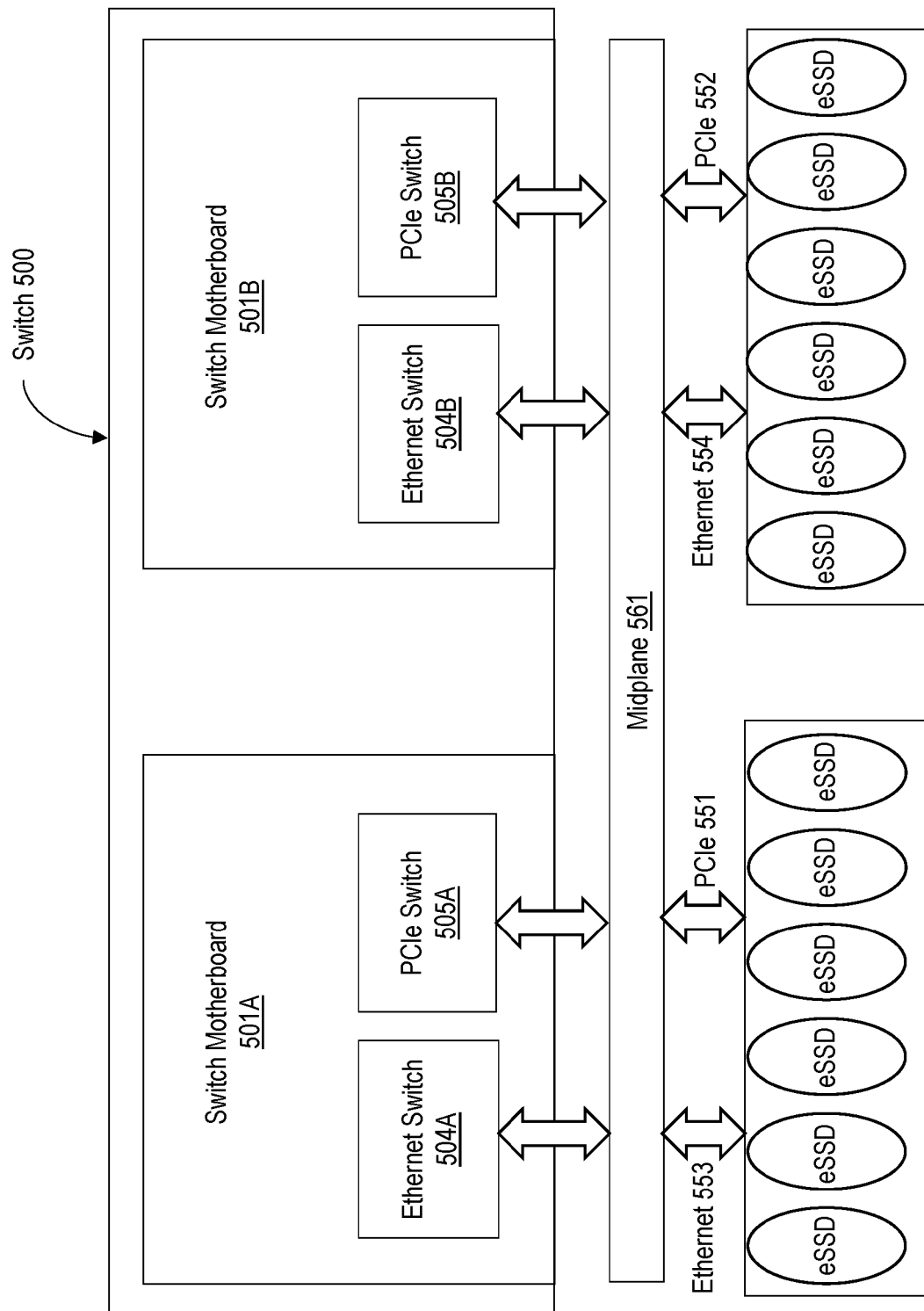
FIG. 5 illustrates a block diagram of an example switch including two switch motherboards, according to one embodiment.

FIG. 5 illustrates a block diagram of an example switch including two switch motherboards, according to one embodiment. The switch 500 includes two switch motherboards 501A and 501B to support multi I/O in a dual port configuration (in a HA mode). The switch motherboard 501A includes an Ethernet switch 504A and a PCIe switch 505A, and the switch motherboard 501B includes an Ethernet switch 504B and a PCIe switch 505B. Each of the switch motherboards 501A and 501B can include other components and modules, for example, a local CPU, a BMC, uplink Ethernet ports, downlink Ethernet ports, etc. as shown in the example switch motherboard 201 shown in FIG. 2.

Several eSSDs can be plugged into device ports of the switch. For example, each of the eSSDs is connected to the switch using a U.2 connector. Each eSSD can connect to both the switch motherboard 501A and the switch motherboard 501B. In the present example, the eSSDs plugged into the switch 500 are configured as an NVMeoF device requiring connectivity to the switch 500 over the midplane 561 via the PCIe bus and Ethernet ports.

According to one embodiment, the Ethernet signals between the switch 500 and the eSSDs can use SAS pins S2, S3, S5, and S6 for the primary Ethernet port 553 to the switch motherboard 501A. The Ethernet signals can also use S9, S10, S12, and S13 for the secondary Ethernet port 554 to the switch motherboard 501B. E25 pin of each U.2 connector can be used to enable the dual port configuration. PCIe signals can be carried over to PCIe buses 551 and 552 between the respective switch motherboards 501A and 501B and each of the eSSDs. The eSSD can self-configure its operational mode using a physical pin (e.g., a presence pin on the chassis of the switch) or by an in-band command from a BMC of the switch motherboard.

According to one embodiment, the switch 500 can support 10G Ethernet, and the midplane 561 is a common midplane that can support both a HA mode and a non-HA mode. Depending on the system configuration, signal integrity may need to be tested to ensure that the common midplane 561 can support for both configurations. If the signal integrity is not sufficient, the system can have two midplanes including the first midplane for the HA mode and the second midplane for the non-HA mode.

According to one embodiment, a system includes a fabric switch including a motherboard, a baseboard management controller (BMC), a network switch configured to transport network signals, and a PCIe switch configured to transport PCIe signals; a midplane; and a plurality of device ports. Each of the plurality of device ports is configured to connect a storage device to the motherboard of the fabric switch over the midplane and carry the network signals and the PCIe signals over the midplane. The storage device is configurable in multiple modes based on a protocol established over a fabric connection between the system and the storage device.

The storage device may have a U.2 connector.

The storage device may support both NVMe and NVMeoF protocols.

The midplane may support both a high availability (HA) mode and a non-HA mode.

The network signals may be carried over unused pins of the connector.

The network signals may provide discovery services or download services for a new firmware of the storage device.

The network signals may include device-specific information including one or more of health status information, field-replaceable unit (FRU) information, and sensor information of the storage device, and the device-specific information may be transported to the BMC over the midplane via PCIe lanes.

The storage device may be configured to operate in a HA mode or a non-HA mode.

According to another embodiment, an NVMeoF includes: a PCIe module; a network engine; and a connector configured to connect to a switch motherboard over a midplane and carry PCIe signals over the midplane. The PCIe module transports PCIe signals to the switch over the PCIe bus, and the network engine transport network signals to the switch over Serial Attached SCSI (SAS) pins of the connector.

The connector may be a U.2 connector.

The network signals may include device-specific information including one or more of health status information, FRU information, and sensor information of the NVMeoF device.

The device-specific information may be carried to a BMC of the switch over the midplane.

The network signals may provide discovery services or download services for a new firmware of the NVMeoF device.

The switch may include two switch boards including a primary Ethernet port and a secondary Ethernet port.

SAS pins S2, S3, S5, and S6 may be used for the primary Ethernet port, and SAS pins S9, S10, S12, and S13 may be used for the secondary Ethernet port.

The NVMeoF device may be configured to operate in a HA mode or a non-HA mode.

According to yet another embodiment, a system includes: a switch and a plurality of NVMeoF devices. Each NVMeoF device is configured to be coupled to the switch using a connector. The connector is configured to transport the PCIe signals to the switch over a PCIe bus and transport network signals to the switch over a network bus.

The connector may be a U.2 connector.

The PCIe signals may be transported over two PCIe lanes of the PCIe bus, and the network signals may be transported over the remaining two PCIe lanes of the PCIe bus.

The network signals may be transported over SAS pins.

The network signals may include device-specific information including one or more of health status information, FRU information, and sensor information of each NVMeoF device.

The network signals may provide discovery services or download services for a new firmware of each NVMeoF device.

Each NVMeoF device of the NVMeoF devices may be configured to operate in a HA mode or a non-HA mode.

The above example embodiments have been described hereinabove to illustrate various embodiments of implementing a system and method for supporting multi-path and/or multi-mode NVMeoF devices. Various modifications and departures from the disclosed example embodiments will occur to those having ordinary skill in the art. The subject matter that is intended to be within the scope of the invention is set forth in the following claims.

What is claimed is:

1. A device comprising:
a connector configured to connect to an apparatus,
wherein the device is removably connected to the apparatus,
wherein the device transmits a first type of signal to the apparatus via a first signal path,
wherein the device transmits a second type of signal to the apparatus via a second signal path, wherein the second signal path is different from the first signal path,
wherein the connector comprises a multi-protocol connector,
wherein the first type of signal is transmitted using one or more repurposed pins of the multi-protocol connector, and
wherein the device further comprises an Ethernet port connected to the one or more repurposed pins.

2. The device of claim 1, wherein the device provides device-specific information and sensor information of the device to the apparatus via the second signal path, wherein the device-specific information includes one or more of health status information or field-replaceable unit (FRU) information.

3. The device of claim 1, wherein the device is field-configurable to switch between a non-volatile memory express (NVMe) device and an NVMe over fabrics (NVMeoF) device.

4. The device of claim 1, wherein the device is operable in a high availability (HA) mode or a single port mode.

5. The device of claim 1, wherein the one or more repurposed pins comprise one or more Serial Attached Small Computer System Interface (SCSI) (SAS) pins of the multi-protocol connector.

6. The device of claim 1, wherein the Ethernet port is a first Ethernet port, the one or more repurposed pins are one or more first repurposed pins, the second type of signal is transmitted using one or more second repurposed pins of the multi-protocol connector, and the device further comprises a second Ethernet port connected to the one or more second repurposed pins.

7. The device of claim 1, wherein the first type of signal provides at least one of a discovery service or a download service for a firmware of the device.

8. A system comprising:
a motherboard comprising an Ethernet port; and
a midplane;
wherein the midplane is configured to connect a storage device to the motherboard using a multi-protocol connector,
wherein the midplane is configured to transmit a first type of signal between the storage device and the Ethernet port of the motherboard and transmit a second type of signal between the storage device and the motherboard, and
wherein the first type of signal is transmitted using one or more repurposed pins of the multi-protocol connector.

9. The system of claim 8, further comprising a peripheral component interconnect express (PCIe) switch configured to transmit the first type of signal between the motherboard and the storage device, and wherein the storage device provides information associated with the storage device using the midplane via at least one PCIe lane of the PCIe switch.

10. The system of claim 8, wherein the storage device is configurable based on a protocol, and the protocol comprises at least one of a non-volatile memory express (NVMe) protocol or an NVMe over fabrics (NVMeoF) protocol.

11. The system of claim 8, wherein the midplane supports a high availability (HA) mode and a single port mode.

12. The system of claim 11, wherein the storage device is configurable to operate in the HA mode or the single port mode.

13. The system of claim 8, wherein at least one of the first type of signal or the second type of signal provides discovery services or download services for a firmware of the storage device.

14. The device of claim 1, further comprising a switch module, wherein the switch module is capable of switching a signal path of the second type of signal from the second signal path to the first signal path according to an operation mode.

15. The system of claim 8, wherein the storage device is capable of switching between the first signal path and the second signal path according to an operation mode.

16. A system comprising:
an apparatus including a motherboard and a switch configured to transmit a signal;
a midplane; and
at least one device port,
wherein the device port is configured to connect a storage device to the motherboard and transmit the signal using the midplane,
wherein the storage device is configurable based on a protocol,
wherein the storage device is capable of switching a signal path of the signal from a first signal path to a second signal path according to an operation mode,
wherein the storage device comprises a multi-protocol connector configured to connect the storage device to the device port,
wherein the signal is transmitted using one or more repurposed pins of the multi-protocol connector, and
wherein the storage device comprises an Ethernet port connected to the one or more repurposed pins.

17. The system of claim 8, wherein:
the Ethernet port is a first Ethernet port, and the one or more repurposed pins are one or more first repurposed pins,
the motherboard further comprises a second Ethernet port,
the midplane is configured to transmit the second type of signal between the storage device and the second Ethernet port of the motherboard, and
the second type of signal is transmitted using one or more second repurposed pins of the multi-protocol connector.

18. The system of claim 8, wherein the one or more repurposed pins comprise one or more Serial Attached Small Computer System Interface (SCSI) (SAS) pins of the multi-protocol connector.

* * * * *